Feb. 24, 1970  G. H. WAKEFIELD  3,497,163
SUPERSONIC AIRCRAFT

Filed May 24, 1966  4 Sheets-Sheet 1

INVENTOR.
GEORGE H. WAKEFIELD
BY
Mason, Mason & Albright
ATTORNEYS

Feb. 24, 1970    G. H. WAKEFIELD    3,497,163
SUPERSONIC AIRCRAFT

Filed May 24, 1966    4 Sheets-Sheet 2

INVENTOR
GEORGE H. WAKEFIELD
BY Mason, Mason & Albright
ATTORNEYS

Feb. 24, 1970  G. H. WAKEFIELD  3,497,163
SUPERSONIC AIRCRAFT
Filed May 24, 1966  4 Sheets-Sheet 3

INVENTOR
GEORGE H. WAKEFIELD
BY
Mason, Mason & Albright
ATTORNEYS

INVENTOR
GEORGE H. WAKEFIELD

United States Patent Office 3,497,163
Patented Feb. 24, 1970

3,497,163
SUPERSONIC AIRCRAFT
George H. Wakefield, 700 Hudson Ave.,
Takoma Park, Md. 20012
Filed May 24, 1966, Ser. No. 552,499
Int. Cl. B64c 3/36, 5/12; B64d 27/12
U.S. Cl. 244—13                                44 Claims

ABSTRACT OF THE DISCLOSURE

A supersonic aircraft having retractable wings and stabilizer controls wherein the leading edge of the airfoil is a continuous air inlet and the fuselage and all remaining portions of the aircraft are situated largely downstream of the air inlet, the aircraft being substantially T-shaped in configuration, a large portion of the shock wave generated by the aircraft being received into the air inlet.

OBJECTS OF THE INVENTION

This invention relates to aircraft and more particularly to improvements in supersonic aircraft.

The main object of the invention is to produce a supersonic aircraft that operates very efficiently at high supersonic speeds, particularly at design speed and altitude, and very effectively at subsonic speeds, thereby greatly extending the flying range of supersonic aircraft. A large air inlet is required for an air-breathing engine in a rarefied atmosphere. In the invention advantage is taken of this in several ways. At design speed and altitude this air inlet area becomes a most favorable shelter from the relative wind behind which the whole aircraft is located, except for a small lower portion of the craft used to produce part of the aerodynamic lift. This sheltering act becomes a great means for reducing many power losses and may be used in any varying degree. Conventional and experimental supersonic aircraft designs fail to appreciate that the air inlet area may be utilized for many other purposes.

Another object of the invention is to reduce the craft's frontal drag area to a minimum—if not eliminate it altogether. The frontal drag produced by the front windows in the present supersonic aircraft is enormous. That produced by the protruding fuselage is even more. In the aircraft of the invention this great power loss is prevented by using the leading edge adjustable air inlet to double as cabin windows and as engine ram compressor parts. The aircraft shape is thus brought into the most efficient working relationship in respect to its jet engines and their air inlets. The external heating effect, and the external heating area both are reduced to a minimum. Boundary layer power losses cannot be appreciably reduced unless there is a less disturbed air flow past the craft. This also has been accomplished. By these same procedures and contrary to expectation, an immense housing capacity for passengers or freight is also made available.

Not limiting the invention but when reference is made to design speed and altitude, speeds between Mach 1.8 and 4.4 and elevations between 60,000 and 125,000 feet are contemplated.

Another object of the invention is to reduce and eliminate objectionable shock wave noises such as the sonic boom produced by aircraft at transonic and supersonic speeds.

Another object is to construct, arrange and combine aircraft parts and elements in a manner so as to provide an aerodynamically stable aircraft at all operational speeds without undue sacrifice of payload, speed or range.

Another object is to more effectively utilize a rectangular shaped adjustable air inlet diffuser on the leading edge of a supersonic airfoil.

Another object is to provide suitable retractable tail parts for supersonic aircraft and retractable wing tips for retractable subsonic airfoils for supersonic aircraft.

Another object is to provide an adjustable shock wave control member for an adjustable air inlet diffuser for supersonic aircraft.

Another object is to provide a supersonic airfoil with right and left-hand sweep-back angles in order to maneuver the center of lift produced by the retractable subsonic airfoils into a lateral line with the center of lift produced by other craft parts at supersonic speeds when the subsonic airfoils are retracted.

Another object is to make a supersonic aircraft capable of vertical or near vertical takeoff and landing by providing adjustable vertical thrust on a lateral line that passes through the craft's center of lift.

Another object is to provide a combination turbojet-ramjet engine with a forwardly extended turbine compressor to reduce the volume, not the mass of compressed air within the supersonic aircraft.

Another object is to provide supersonic aircraft with retractable canopies and to make all retractable parts fully retractable to reduce air resistance.

A yet further object of the invention is to provide a supersonic aircraft with a cabin with a forward vision through transparent duct and air inlet diffuser parts located in a supersonic airfoil.

A further object of the invention lies in the proportionate thickness and width relationships between the supersonic airfoil having considerable housing capacity and the adjoining downstream fuselage and tail.

Other objects, adaptations, and possibilities will appear as the description progresses, reference being had to the accompanying drawings, in which:

DESCRIPTION OF THE PREFERRED EMBODIMENTS

Figure 3:
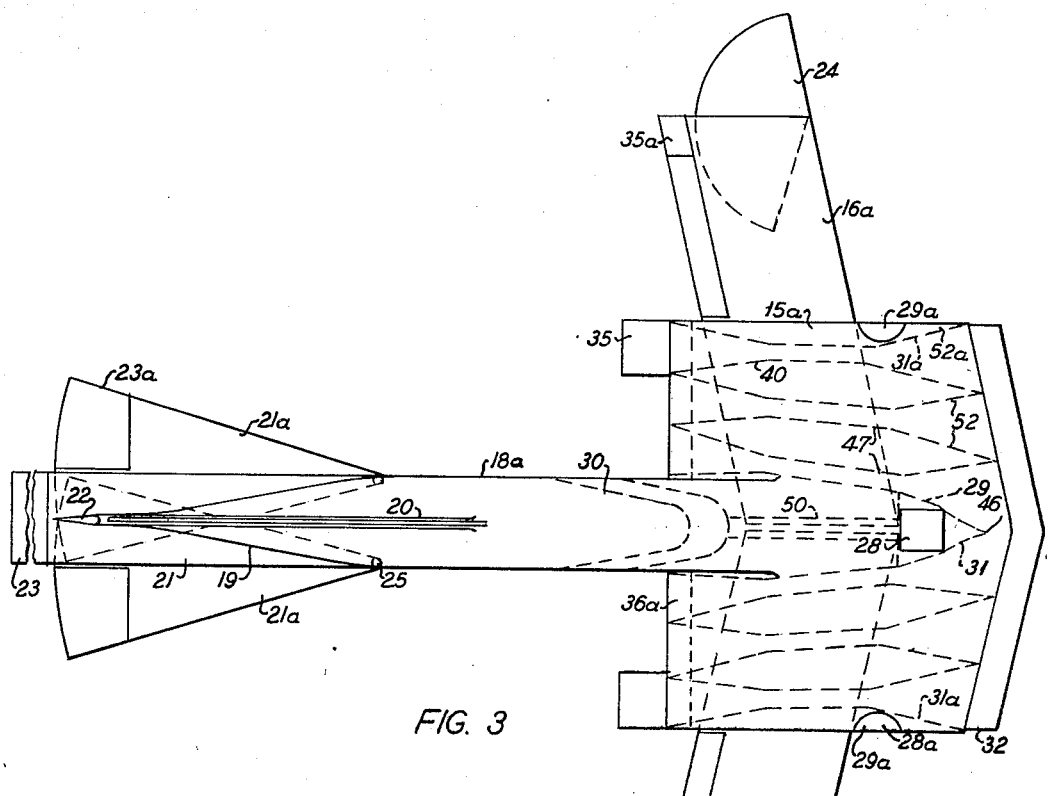
FIGURES 3 and 4 are plan and side elevational views of a further form of the invention similar to those shown in FIGURES 1 and 2.
Figure 4:
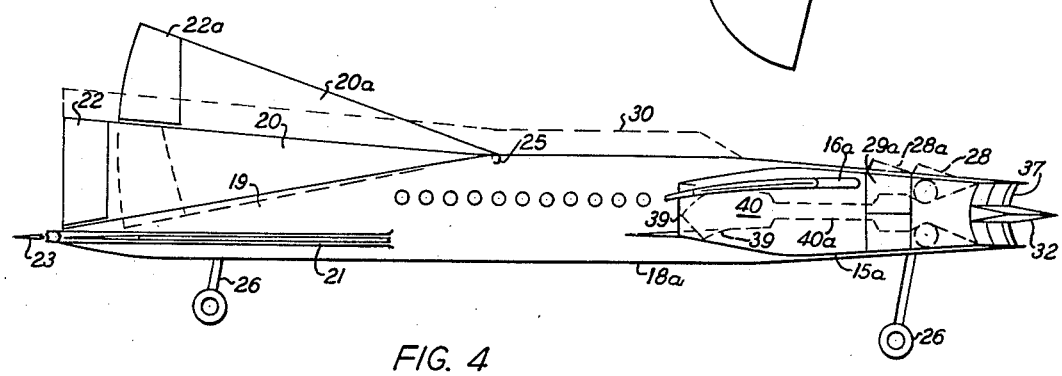

Referring now to FIGURES 1-4, is will be noted that a supersonic airfoil 15 is swept back relative to the aircraft's center line which disposition, as previously noted, facilitates the location of the retractable subsonic airfoils 16 in an appropriate lift relationship to the aircraft when traveling at subsonic speeds. The tail 19 which is attached to the end of the body or fuselage 18, comprises a set of hollow vertical and horizontal stabilizers 20 and 21, respectively, which include a rudder 22 and elevator 23 for control of the aircraft at supersonic speeds. A set of retractable vertical and horizontal stabilizers 20a and 21a, respectively, with attached rudder 22a and elevators 23a, are retractable into their respective hollow stabilizers 20 and 21 by hydraulic or other means well known to the art. It will be appreciated that the stabilizers 20a and 21a with their control surfaces 22a and 23a will normally be retracted when the aircraft is traveling at supersonic speeds. It will also be appreciated that one of the horizontal stabilizers 21a on one side of the tail 19 will be slightly higher than the one on the other side to permit the nesting of such stabilizers within the tail 19. If desired, however, the width of the retractable horizontal stabilizers 21a and 21b, FIGURE 5, may be reduced and they may be butted when stored so that a vertical offset is unnecessary. This structure meets the need for more control and lift surfaces at low subsonic speeds; nevertheless, these parts need not project beyond the fuselage's width and height at high supersonic speeds. The tail portion 19 may have a configuration (such as is shown in FIGURES 3 and 4, for example) whereby the hollow stabilizers 21 may be disposed at a different vertical relationship relative to the fuselage 18a than that shown in FIGURES 1 and 2. Throughout the drawings similar characters of reference refer to similar parts.

For control at supersonic speeds, the aircraft includes ailerons 35 which project from the trailing edge of the supersonic airfoil 15, 15a, and 15b. The retractable subsonic airfoils 16, 16a, and 16b include ailerons 35a and flaps 36. All three are used to help maintain lift and control at subsonic speeds. At subsonic speeds both sets of adjustable tail and wing control surfaces 22, 23, 22a, 23a, 23b, 35 and 35a may be used to control the aircraft.

As shown in FIGURES 3 and 4, retractable wing tips 24 are provided to lessen wing tip vortices and reduce wing lift losses at low speeds. They are retractable into the retractable subsonic airfoils 16a by hydraulic jacks not shown or other means common to the art. Some air is excavated (pushed out of the way) by the form of the aircraft shown in FIGURES 3 and 4. At design speed and altitude aircraft skin air-excavating angles should be less than 54 percent of the Mach wave angle for that speed. And all aircraft skin angles involved should be feathered to a less angle upstream. In the form of the invention shown in FIGURES 1, 2, 5, 6 and 7, little or no air need be excavated by the aircraft skin. This is possible because adequate thrust may be converted into lift by one or more of the directionally adjustable tail pipes 39. Continued combine thrust and lift may be produced under the front center of the fuselage 18, 18a, 18b by tail pipes 39a. See FIGURE 6. The form of the aircraft shown in FIGURES 5, 6 and 7 will have considerable tail lift without vertical thrust assistance. This lift is produced by the sloping upper surface 27 of the fuselage 18b and tail 19a. To enable the aircraft to make substantially vertical takeoffs, the thrust nozzles 39 may be selectively aimed downwardly as shown by the dotted lines in FIGURES 2, 4, and 6. By comparing FIGURES 1 and 2 with FIGURES 3 and 4 it becomes very evident that a great increase in aircraft housing capacity may be had by increasing the chord length of the supersonic airfoil 15a.

Figure 1:
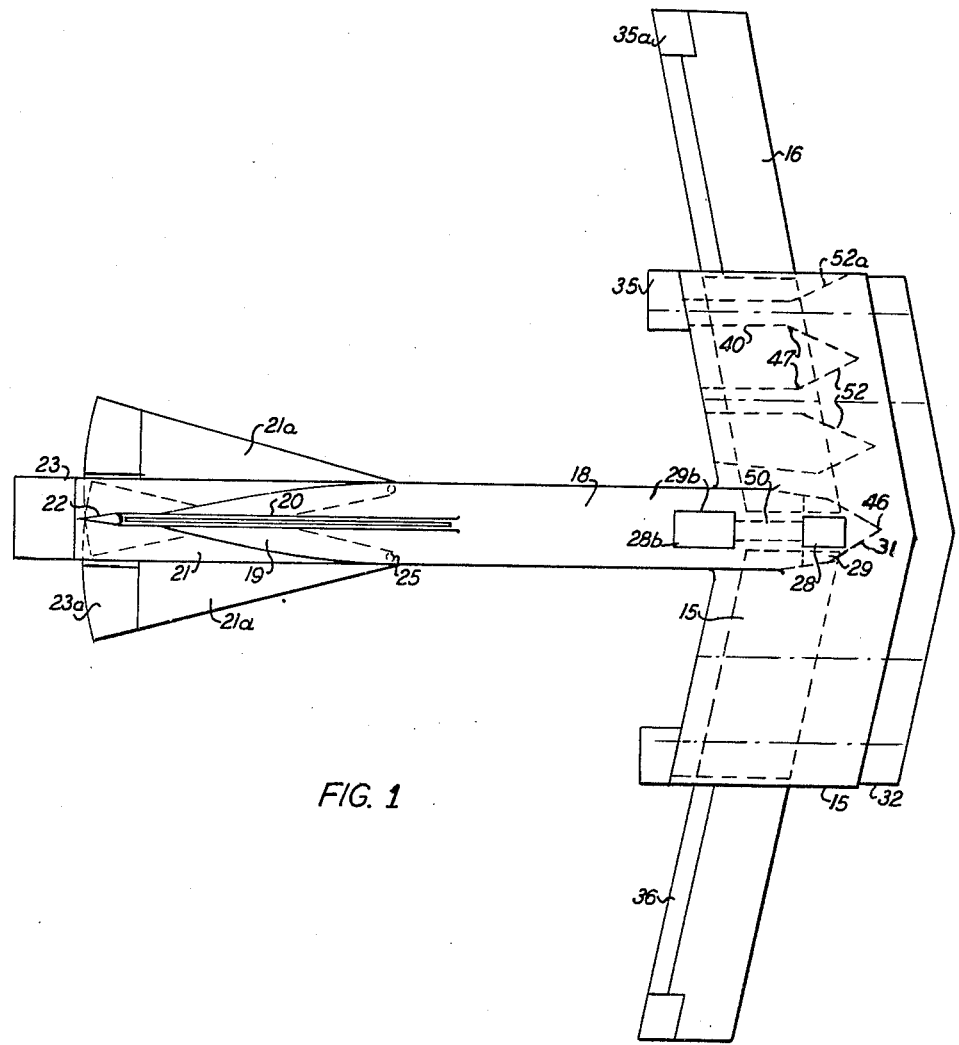
FIGURES 1 and 2 show plan and side elevational views of an aircraft in accordance with the invention.
Figure 2:
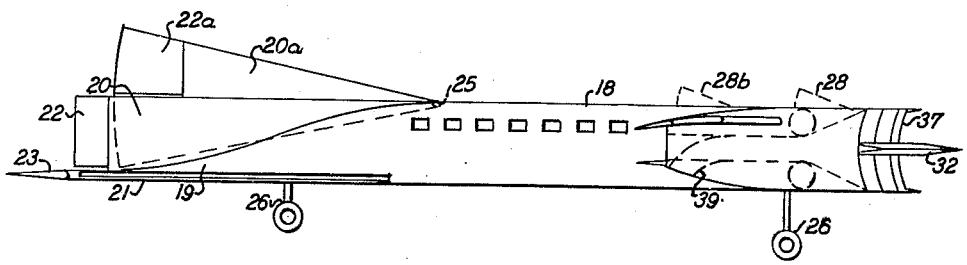

It is to be understood that the subsonic airfoils 16, 16a and 16b are retractable into the supersonic airfoil 15, 15a and 15b as shown in dotted lines therein. The means of retraction may be mechanical, hydraulic or other suitable means as would occur to one skilled in the art. Similar airfoils were disclosed in my Patent No. 2,877,965 of Mar. 17, 1959, and in references thereto. The adjustable air inlet diffuser 37 is also of a type disclosed in my U.S. Patent No. 2,877,965. It likewise consists of moveable upper and lower diffuser members 44 and 44a. See FIGURE 10. Each is securely hinged to the leading edge 45 of the supersonic airfoil 15, 15a and 15b and actuated by suitable means to govern engine air needs and shock wave conditions. To these members 44 and 44a are attached upper and lower overlapping or butted telescoping plates 38, 38a. These plates telescope into the air inlet partitions 52 or ends 52a. In FIGURES 1 and 3 these parts are indicated by dotted lines.

Figure 9:
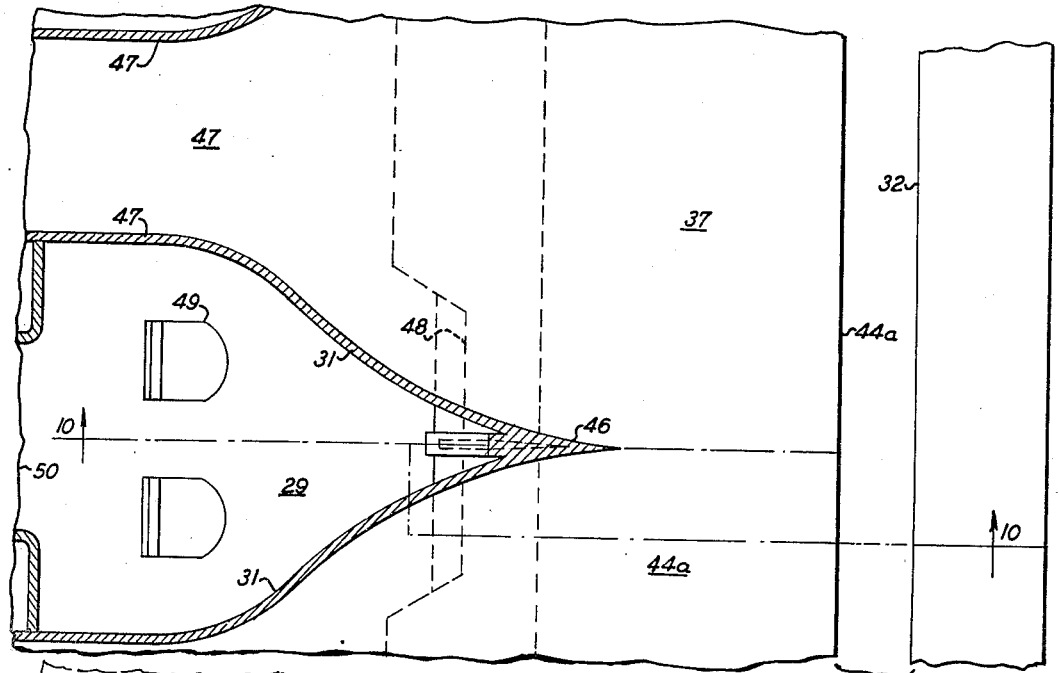
FIGURES 9 and 10 show in section a pilot's cabin disposed behind transparent adjustable air inlet parts and an adjustable shock wave control member for adjustable air inlets.
Figure 10:
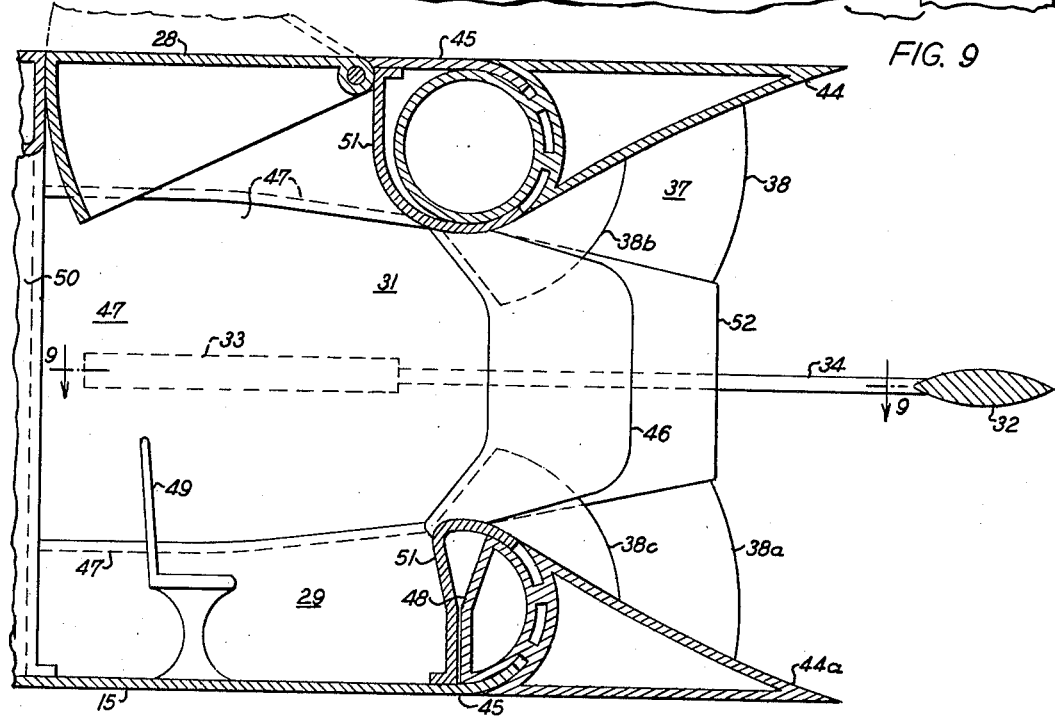

Another type of air inlet partition 46 is shown in FIGURES 9 and 10 and indicate in FIGURES 1-6. It is transparent and has transparent wrap-around walls 31 which extend to and form part of the engine air inlet duct 47. These transparent walls 31 provide excellent forward vision from the pilot's forward and side cabins 29 and 29a. Two partition plates 38b and 38c, one attached to the upper diffuser member 44 and the other to the lower member 44a may or may not be used. They telescope into the transparent partition 46 in abutting manner and slide in or out when the diffuser 37 is closed or opened.

Additional foot room or space in the forward cabin 29 can be made available by changing the shape of the shaft portion of the lower diffuser member 44a at 48 just in front of the seats 49 as shown in FIGURE 10. Access is provided to the main cabin in fuselage 18, 18a, 18b by passageway 50. The upper and lower front cabin walls 51 make arcuate sliding connections with the diffuser members 44, 44a, as do the top and bottom walls of air ducts 47. Their side walls 31 are transparent adjacent the forward and side cabins 29, 29a. From FIGURES 3 and 4 it is apparent that not only forward but top, bottom and side vision may be had from either windowed side cabin 29a behind similar transparent air inlet diffuser parts 31a. Optionally, the partitions 52 and 46 may be transposed. For other diffuser details, see my U.S. Patent No. 2,877,965.

As shown in FIGURES 9 and 10, an air-splitting plate or shock wave control member 32 is adjustable fore and aft by appropriate means such as hydraulic jacks 33 connected to the control member 32 by means of rods 34. The jacks 33 will normally be secured between the ducts 47. The shock waves produced at supersonic speeds by the control member 32 may be positioned and utilized to help prevent ram compression losses within the diffuser 37.

Figure 6:
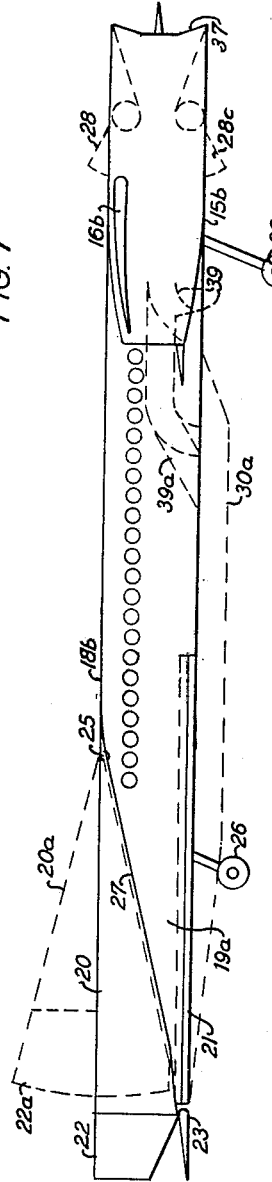

One or more retractable transparent canopies 28, 28a, 28b and 28c may be provided if desired for increased vision at subsonic speeds, landing, takeoff and on certain types of military aircraft, at higher speeds. They may be located over any cabin 29, 29a and 29b as at the front center, side, or middle center aircraft positions and under the craft as shown in FIGURE 6, 28c. They may be hinged at their upstream edge as shown in FIGURE 10 and actuated by any suitable means. Their extended positions are shown in dotted lines.

The raised or lowered permanent fuselage distorting cabins 30, and 30a indicated in FIGURES 3 to 6 by dotted lines, may be used. They afford excellent visibility, but the price in increased frontal drag is enormous and the shock wave noises produced may be intolerable.

Figure 8:
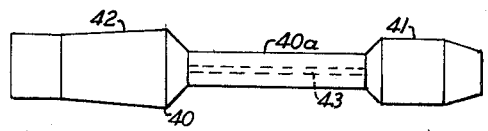
FIGURE 8 shows a jet engine or turbojet ram jet combination engine modified so as to increase the housing capacity of the supersonic aircraft in accordance with the invention.

FIGURE 8 illustrates a jet engine configuration or a turbojet-ramjet combination engine which is modified to increase the housing capacity of supersonic aircraft. As shown in FIGURES 3 and 4, to convey or contain a given mass of compressed air takes far less space than for uncompressed air. The middle engine connecting portion 40a consists of one or more tubes of any suitable length used to convey the compressed air from the turbine compressor end 41 to the burner and turbine end 42 of the power plant 40. The connecting shaft or shafts 43 may be within the tube or tubes 40a as shown or outside of them.

Figure 5:
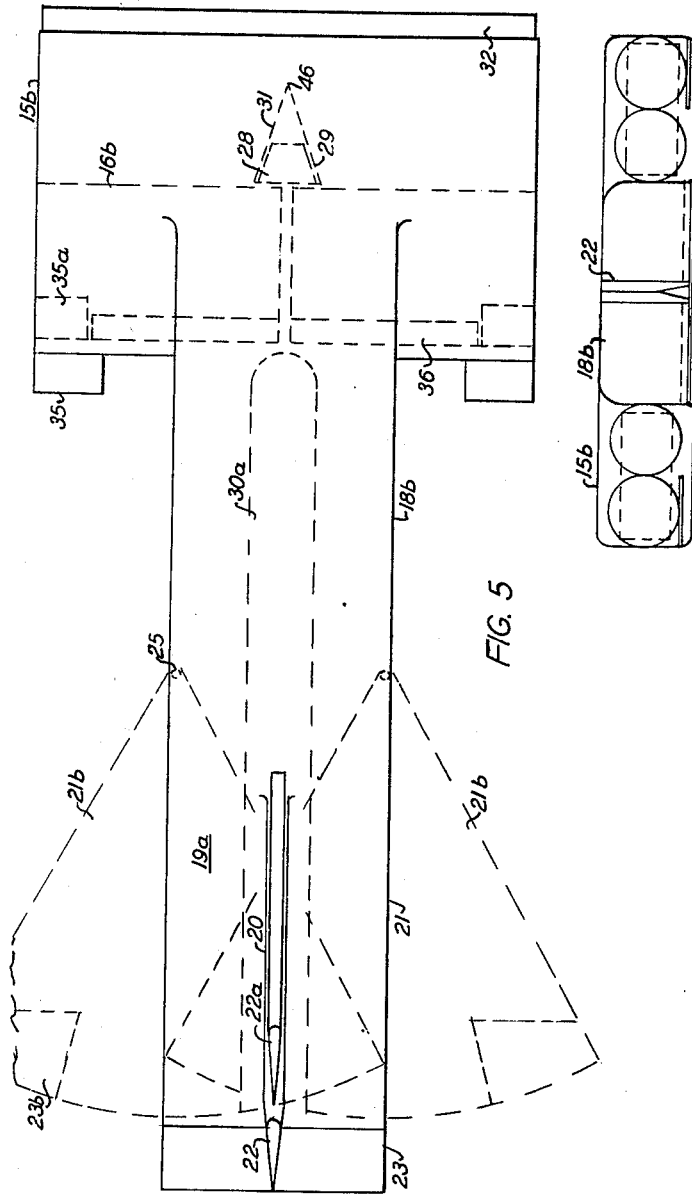
FIGURES 5, 6 and 7 show plan, side and rear elevational views of a still further form of the aircraft in accordance with the invention.
Figure 7:
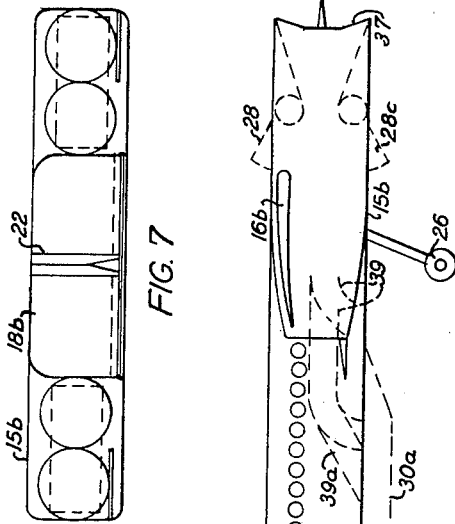

FIGURES 5-7 show a form of the aircraft which has a greatly increased carrying and housing capacity. It is provided with a rectangular-shaped supersonic airfoil 15b which may be made any convenient length. This aircraft has practically no frontal drag area at design speed and altitude. The retractable horizontal stabilizers 21b swing from suitable hinge joints 25 as may all the retractable stabilizers 20a and 21a. Because of the increased width of the fuselage or body, 18b and tail 19a these stabilizers 21b may be of sufficient size to produce considerable lift at subsonic speeds. When half retracted into the tail 19a their elevators or elevons 23b may still be used. At design speed they may be stored one above the other or butted at the center of the tail 19a in the hollow horizontal stabilizers 21. The aircraft shown in FIGURES 1-7 may be further controlled by ailerons 35, 35a, flaps 36, 36a and rudders 22 and 22a. In FIGURES 5 and 6 all the retactable parts are shown retracted except the retractable landing gear 26. The retractable subsonic airfoils 16b may be provided with retractable wing tips 24 as shown in FIGURE 3. In FIGURE 7 all retractable parts are shown retracted.

For increased aircraft frame strength and stability at supersonic speeds and to increase the housing capacity and to reduce noise and drag, there is advantage that the span of the supersonic airfoil be less than four times its chord length and the fuselage have a lateral width of greater than one-sixth of such span, and that the supersonic airfoil fuselage and tail have the same thickness.

While I have described the preferred embodiments of my invention, it is to be understood that it is capable of other adaptions and modifications.

Having thus described my invention, what I claim as new and desire to secure by Letters Patent of tne United States is:

1. An aircraft for flight at supersonic speeds comprising an elongated accommodation body, propulsion means including a transversely extending member disposed on the forward end of said accommodation body whereby all parts of the body are to the rearward relative to said transversely extending member and said accommodation body together with said transversely extending member is approximately T-shaped, the forward part of said transversely extending member comprising a substantially continuous leading edge air inlet diffuser for said propulsion means, said air inlet diffuser including upper and lower adjustable members with leading edges disposed to point upstream and situated whereby shock waves caused by said adjustable members are received in said air inlet diffuser.

2. An aircraft in accordance with claim 1 including airfoils carried by said transversely extending member whereby said airfoils may be selectively extended from said transversely extending member.

3. An aircraft in accordance with claim 1 including a pilot control area situated within said air inlet diffuser.

4. An aircraft in accordance with claim 1 including a pair of rudder members disposed at the rear of said body, one of said rudder members, extendably carried within the other said rudder member whereby one said rudder member may be selectively extended from the other said rudder member.

5. An aircraft in accordance with claim 1 including a plurality of stabilizer and control members disposed to the rear of said body, part of said stabilizer and control members extendably carried in said body whereby they may be selectively extended therefrom.

6. In combination, a supersonic airfoil designed to fly at supersonic speeds, an adjustable air inlet along the leading edge of said airfoil, jet engines housed within said airfoil, a fuselege attached to and entirely disposed in the downstream part of said airfoil from its center, a tail with stabilizing and control members attached to said fuselege, said air inlet having an opening length substantially equal to the span of said airfoil and an opening height at design speed and altitude greater than one-third of the vertical dimension of said supersonic airfoil.

7. The combination of claim 6 wherein said fuselage has a protruding cabin on its top.

8. An aircraft in combination with a laterally extending supersonic airfoil designed to fly at supersonic speeds, retractable subsonic airfoils housed within said supersonic airfoil, an air inlet along the leading edge of said supersonic airfoil, jet engines secured within said supersonic airfoil, tail pipes from said jet engines disposed across the trailing edge of said supersonic airfoil, a fuselage secured to and situated entirely downstream of said supersonic airfoil at its center whereby said airfoil together with said fuselage is approximately T-shaped and no part of the aircraft is upstream of said air inlet, and a tail for said fuselage.

9. In combination, a supersonic airfoil designed to fly at supersonic speeds, an adjustable air inlet along the leading edge of said airfoil, jet engines secured within said airfoil, ducting connecting said air inlets to said jet engines, a fuselage with a tail connected to the downstream portion of said supersonic airfoil at its center, transparent air parting partitions in said adjustable air inlet, a cabin within one of said partitions and within said supersonic airfoil.

10. A combination of claim 9 wherein a retractable canopy is situated above said cabin.

11. The combination of claim 9 including a retractable canopy situated below said cabin.

12. In combination, a supersonic airfoil designed to fly at supersonic speeds, jet engines within said airfoil, an adjustable air inlet along the leading edge of said airfoil, upper and lower diffuser members defining said air inlet, ducting connecting said air inlet to said jet engines, a fuselage with a tail connected only to the downstream portion of said airfoil at its center whereby said airfoil together with said fuselage is approximately T-shaped, each said upper and lower diffuser member having a flat outside surface and a concave inside surface and being similar in configuration, said air inlet adapted to receive substantially all strong shock waves formed therein without upstream interference at design speed and altitude.

13. An aircraft designed to fly at supersonic speeds comprising a supersonic airfoil disposed across the front portion of said aircraft, an uninterrupted adjustable diffuser air inlet along the leading edge of said airfoil, jet engines carried within said airfoil, tailpipes from said jet engines at the trailing edge of said airfoil and located adjacent the lateral axis through the center of gravity of said aircraft, a fuselage connected to said airfoil at its center so as to extend only downstream therefrom whereby said airfoil together with said fuselage is approximately T-shaped, a tail included at the after portions of the fuselage, leading edge members for said air inlet which are substantially of equal length, said supersonic airfoil having a maximum vertical dimension of said fuselage where it joins said fuselage, said airfoil having box-shaped ends and a span length less than the longitudinal length of said fuselage including said tail, said tail having a vertical dimension and a lateral dimension which are slightly larger than those of said fuselage at design speed and altitude.

14. An aircraft in accordance with claim 13 wherein retractable horizontal and vertical stabilizers are included in said tail.

15. An aircraft in accordance with claim 14 wherein retractable horizontal stabilizers are retractably stored side by side in said tail.

16. An aircraft designed to fly at supersonic speeds comprising a substantially straight supersonic airfoil disposed across the front portion of said aircraft, an adjustable diffuser air inlet along the leading edge of said airfoil, jet engines carried within said airfoil, tailpipes from said jet engines at the trailing edge of said airfoil, a fuselage connected to the downstream portion of said airfoil at its center whereby said airfoil together with said fuselage is approximately T-shaped, a tail included at the after portion of said fuselage, said supersonic airfoil having a vertical dimension substantially equal to the vertical dimention of said fuselage, retractable horizontal and vertical control stabilizers being included in said tail whereby when said horizontal stabilizers are retracted they are stored one above the other.

17. An aircraft comprising an airfoil designed to fly at supersonic speeds disposed across the front end thereof, an adjustable air inlet rectangular in shape extending across the leading edge of said airfoil, a fuselage attached to the downstream portion of said airfoil at its center, a tail attached to the downstream end of said fuselage, a hollow vertical stabilizer and a pair of flat hollow horizontal stabilizers included in said tail, said horizontal stabilizers having their top and bottom outside surfaces substantially parallel to the relative wind, open edges for said hollow stabilizers, adjustable control surfaces attached to and extending downstream of said hollow stabilizers, a retractable vertical stabilizer and a pair of retractable horizontal stabilizers adapted to be received into said hollow stabilizers at their said open edges, jet engines housed within said airfoil including directionally adjustable tailpipes with outlets along the trailing edge of said airfoil, said tailpipes and their outlets located substantially at the lateral axis of the center of gravity of said aircraft and adapted to produce thrust in selective directions between horizontal and vertically downward directions relative to said aircraft, said rectangular-shaped air inlet disposed substantially upwind of said fuselage and all other parts of said aircraft.

18. An aircraft in accordance with claim 17 wherein each of said retractable stabilizers includes an adjustable control surface.

19. An aircraft in accordance with claim 17 wherein said open edges of said hollow stabilizers are substantially parallel to the relative wind, said retractable stabilizers being retractable into said hollow stabilizers until flush with said open edges.

20. In combination with a supersonic airfoil designed to fly at supersonic speeds, an adjustable diffuser air inlet of rectangular shape along the leading edge of said airfoil, retractable subsonic airfoils housed within said supersonic airfoil, a fuselage connected to the downstream portion of said supersonic airfoil at its center, a tail for said fuselage, retractable horizontal and vertical stabilizers housed within said tail at supersonic speeds, the frontal cross-sectional area of said supersonic airfoil being rectangular in shape and substantially equal to the cross-sectional inlet area of said adjacent adjustable air inlet at the design speed and altitude, said diffuser inlet being adapted to shelter from the relative wind substantially all other parts of said aircraft at design speed and altitude.

21. An aircraft in accordance with claim 20 wherein said retractable horizontal stabilizers are, when retracted, stored one above the other in said tail.

22. A supersonic aircraft designed to fly at supersonic speeds comprising a supersonic airfoil having a sweptback angle, a fuselage having a tail, said fuselage connected to the trailing edge of said supersonic airfoil at its center, jet engines secured within said supersonic airfoil, an adjustable diffuser air inlet along the leading edge of said airfoil, said adjustable air inlet having upper and lower leading edges of similar configuration, said inlet leading edges outlining air inlet area which is rectangular in shape and extends substantially the entire span length of said supersonic airfoil, said fuselage and all other of the parts of said aircraft being disposed downstream of said inlet area when the aircraft is operating at design speed and altitude.

23. An aircraft in accordance with claim 22 including a cabin located within said fuselage behind said supersonic airfoil.

24. An aircraft in accordance with claim 22 including a retractable canopy situated in the leading half of said supersonic airfoil.

25. A supersonic aircraft designed to fly at supersonic speeds comprised of a supersonic airfoil having a sweptback angle, a fuselage having a tail, said fuselage connected to the trailing edge of said supersonic airfoil at its center, jet engines secured within said supersonic airfoil, and adjustable diffuser air inlet along the leading edge of said airfoil, all of said aircraft parts disposed downstream substantially behind the opening area of said inlet, a retractable canopy situated in the leading half of said supersonic airfoil.

26. In combination with a supersonic airfoil designed to fly at supersonic speeds, jet engines laterally spaced within said airfoil, an adjustable diffuser air inlet along the leading edge of said airfoil, tail pipes along the trailing edge of said airfoil, a fuselage having a tail, said fuselage connected to the downstream part of said airfoil at its center, said airfoil having upper and lower skin surfaces, said air inlet including upper and lower adjustable members defining the front end air inlet area, each said adjustable member having inside and outside skin faces, substantially all of said outside skin faces being substantially parallel to the line of flight of the aircraft and substantially in the same plane as the adjacent part of said upper and lower airfoil skin surfaces at design speed and altitude, said upper and lower adjustable members having substantially the same configuration.

27. The structure of claim 26 wherein substantially all parts of the aircraft are disposed downstream and directly behind said air inlet at design speed and altitude.

28. Structure in accordance with claim 26 wherein the said aircraft has all said parallel skin surfaces near said leading edge and said outside skin faces of said adjustable members adjusted to excavate air away from said aircraft at a low angle, to the direction of the relative wind at design speed and altitude.

29. The combination of claim 26 including retractable subsonic airfoils housed within said supersonic airfoil at supersonic speeds.

30. The combination of claim 29 wherein said retractable subsonic airfoils including retractable swing wing tips.

31. The combination of claim 26 including retractable horizontal stabilizers and elevators for said tail.

32. The combination of claim 26 including a retractable vertical stabilizer and rudder for said tail.

33. The combination of claim 26 wherein said jet engines comprise a combination turbojet-ramjet engine.

34. The combination of claim 26 wherein said jet engines comprise a compressor part located near the leading edge of said supersonic airfoil and a spaced connected gas turbine located near the trailing edge of said supersonic airfoil.

35. The combination of claim 34 wherein said jet engines comprise combined turbojet-ramjet engines.

36. In combination with a supersonic airfoil designed to fly at supersonic speeds, jet engines laterally spaced within said airfoil, an adjustable diffuser air inlet along the leading edge of said airfoil, tail pipes along the trailing edge of said airfoil, a fuselage having a tail, the fuselage connected to the downstream part of said airfoil at its center, all said parts disposed downstream of said air inlet substantially parallel relative to the flight air stream and being behind said air inlet, inlet ducts to said jet engines and a cabin located in said supersonic airfoil between said inlet ducts to said jet engines.

37. The combination of claim 36 including a retractable canopy situated above said cabin.

38. In combination with a supersonic airfoil designed to fly at supersonic speeds, jet engines laterally spaced within said airfoil, an adjustable diffuser air inlet along the leading edge of said airfoil, tail pipes along the trailing edge of said airfoil, fuselage having a tail, said fuselage connected to the downstream part of said airfoil at its center, all said parts disposed downstream of said air inlet substantially parallel relative to the flight air stream and behind said air inlet, a retractable canopy which is retractable into said fuselage at its connection to said supersonic airfoil.

39. In combination, a supersonic airfoil designed to fly at supersonic speeds, jet engines within said airfoil, an adjustable air inlet along the leading edges of said airfoil, upper and lower diffuser members defining said air inlet, a jet nozzle from said jet engines disposed at the trailing edge of said airfoil, a fuselage with a tail connected to the downstream portion of said airfoil at its center, an elongated knifelike air-spitting shock wave control member located between said upper and lower diffuser members and extending forward relative to said air inlet, means for adjusting position of said control member whereby said control member is adjustably movable upstream and downstream, said control member having a length substantially equal to that of the said upper and lower diffuser members.

40. An aircraft designed to fly at supersonic speeds having a supersonic airfoil with box-shaped ends across the front end of said aircraft, retractable subsonic airfoils housed within said supersonic airfoil, an air inlet across the leading edge of said supersonic airfoil, a fuselage secured to and situated entirely downstream of said supersonic airfoil from the center thereof whereby no part of the aircraft extends upstream of said air inlet, a tail included with said fuselage, said box-shaped ends finished substantially parallel to the vertical and longitudinal axes of said aircraft.

41. A supersonic aircraft comprising a supersonic airfoil, a fuselage attached to the trailing edge of said airfoil at its center and extending rearwardly therefrom whereby said aircraft has a T-shaped configuration with no parts thereof disposed upstream of said airfoil, a plurality of jet engines being disposed within said airfoil whereby a major portion of the weight of said aircraft is carried by said airfoil.

42. A supersonic aircraft having reduced skin area, skin friction and inward heat flow at design speed and altitude which comprises a supersonic airfoil across the front of said aircraft and an adjustable inlet diffuser rectangular in shape across the front of said airfoil, jet engines housed within said airfoil, tail pipes for said jet engines at the trailing edge of said airfoil, a fuselage with a tail connected to the downstream portion of said airfoil at its center, said inlet diffuser having two channel-defining members with forward leading edges defining the air inlet area, said inlet diffuser adapted to catch, slow down and compress by ram compression substantially all the air encountered directly in front of said fuselage before directing it around said fuselage and into part of said jet engines, said inlet diffuser adapted to catch, slow down and compress by ram compression substantially all other air encountered in front of said supersonic airfoil before directing it straight through the rest of said jet engines and straight into said tail pipes.

43. An aircraft designed for supersonic and subsonic flight which comprises a supersonic airfoil and a body connected to the center thereof downstream of said airfoil, a tail on said body, subsonic control and lift surfaces completely retractable into said tail, subsonic airfoils completely retractable into said supersonic airfoil and adapted to extend therefrom at its lateral ends, said subsonic airfoils and control and lift surfaces being spaced when extended so as to be the greatest practicable distance from each other and at the greatest practicable distance from the center of gravity of said aircraft.

44. An aircraft designed to fly at supersonic speeds comprising a supersonic airfoil disposed across the front portion of said aircraft, an adjustable diffuser air inlet along the leading edge of said airfoil, jet engines carried within said airfoil, tail pipes from said jet engines at the trailing edge of said airfoil and adjacent the lateral axis of said aircraft, a fuselage connected to the downstream portion of said airfoil at its center whereby said airfoil with said fuselage is approximately T-shaped, a tail included at the after portion of said fuselage, retractable horizontal and vertical stabilizers for said tail said horizontal stabilizers stored one above the other when retracted into said tail.

References Cited

UNITED STATES PATENTS

| | | | |
|---|---|---|---|
| 2,418,380 | 4/1947 | Warner | 244—13 |
| 2,584,198 | 2/1952 | Griffith | 244—35 X |
| 2,649,266 | 8/1953 | Darrievs. | |
| 2,744,698 | 5/1956 | Baynes | 244—42 |
| 2,858,091 | 10/1958 | Kapenkin | 244—43 |
| 2,916,230 | 12/1959 | Nial | 244—35 X |
| 2,924,400 | 2/1960 | Ruget | 244—46 |
| 2,981,502 | 4/1961 | Ritchter. | |
| 3,053,477 | 9/1962 | Reiniger. | |
| 3,314,437 | 4/1967 | Pike. | |
| 3,314,629 | 4/1967 | Rethorst | 244—35 |
| 2,836,379 | 5/1958 | Salmon | 244—15 |
| 2,877,965 | 3/1959 | Wakefield | 244—15 |
| 2,973,165 | 2/1961 | Davidson | 244—15 |
| 2,973,921 | 3/1961 | Price | 244—23 X |
| 3,017,140 | 1/1962 | Barnard | 244—15 |
| 3,148,848 | 9/1964 | Price | 244—23 |
| 3,218,005 | 11/1965 | Alvarez Calderón | 244—43 |
| 3,259,065 | 7/1966 | Ross et al. | 244—130 X |

FOREIGN PATENTS 1,372,515  8/1964  France.

MILTON BUCHLER, Primary Examiner

J. E. PITTENGER, Assistant Examiner

U.S. Cl. X.R.

244—43, 46, 55, 130